United States Patent
Tsirkin

(10) Patent No.: US 9,223,616 B2
(45) Date of Patent: Dec. 29, 2015

(54) VIRTUAL MACHINE RESOURCE REDUCTION FOR LIVE MIGRATION OPTIMIZATION

(75) Inventor: Michael S. Tsirkin, Yokneam (IE)

(73) Assignee: Red Hat Israel, Ltd., Raanana (IL)

( * ) Notice: Subject to any disclaimer, the term of this patent is extended or adjusted under 35 U.S.C. 154(b) by 368 days.

(21) Appl. No.: 13/036,732

(22) Filed: Feb. 28, 2011

(65) Prior Publication Data

US 2012/0221710 A1    Aug. 30, 2012

(51) Int. Cl.
  *G06F 15/173* (2006.01)
  *G06F 9/48* (2006.01)
  *G06F 9/50* (2006.01)

(52) U.S. Cl.
  CPC ............ *G06F 9/4856* (2013.01); *G06F 9/5077* (2013.01)

(58) Field of Classification Search
  CPC ....... G06F 12/10; G06F 15/173; G06F 9/455; H04L 29/08081
  USPC .................................. 709/223, 224, 226, 227
  See application file for complete search history.

(56) References Cited

U.S. PATENT DOCUMENTS

| | | | |
|---|---|---|---|
| 2011/0145471 A1* | 6/2011 | Corry et al. | 711/6 |
| 2011/0264788 A1* | 10/2011 | Costa | 709/224 |
| 2012/0036251 A1* | 2/2012 | Beaty et al. | 709/224 |
| 2012/0304176 A1* | 11/2012 | Takeda | 718/1 |
| 2014/0032735 A1* | 1/2014 | Kapoor | 709/224 |

* cited by examiner

*Primary Examiner* — Vivek Srivastava
*Assistant Examiner* — Sibte Bukhari
(74) *Attorney, Agent, or Firm* — Lowenstein Sandler LLP

(57) ABSTRACT

A mechanism for virtual machine resource reduction for live migration optimization is disclosed. A method of the invention includes monitoring a rate of state change of a virtual machine (VM) undergoing a live migration, determining that the rate of state change of the VM exceeds a rate of state transfer of the VM during the live migration process, and adjusting one or more resources of the VM to decrease the rate of state change of the VM to be less than the rate of state transfer of the VM.

10 Claims, 5 Drawing Sheets

VIRTUAL MACHINE RESOURCE REDUCTION FOR LIVE MIGRATION OPTIMIZATION

TECHNICAL FIELD

The embodiments of the invention relate generally to virtualization systems and, more specifically, relate to virtual machine resource reduction for live migration optimization.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Often times, a VM may need to be migrated from one host machine to another host machine for a variety of reasons. This migration process may be a "live" migration process, referring to the fact that the VM stays running and operational (i.e., "live") during most of the migration process. During live migration, the entire state of a VM is transferred from one host machine to another host machine. A critical piece of this transmission of state is the transfer of memory of the VM. The entire memory of a VM can often times fall in the order of gigabytes, which can result in a lengthy live migration transfer process. In addition, because the VM is "live" during this transfer, memory may become "dirty" during the transfer. This means that a particular page of the memory that was already transferred has been modified on the VM that is still residing on the source host. Typically, these "dirty" pages are marked so that those particular pages of memory can be transferred again during the live migration process.

Currently, a problem with the live migration occurs when the rate of state change for a VM is faster than the rate of migration. For instance, with respect to memory, live migration will not be completed as long as the rate of pages being dirtied is faster than the rate of page migration. The solutions to this problem have either involved (1) continue transfer pages and dirtying pages at the full speed of the VM and hope that migration will eventually complete, or (2) stop the VM and complete migration. These solutions are implemented without regard to the number of CPUs on a migrating VM or an ability to limit computing resources implemented by the VM.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
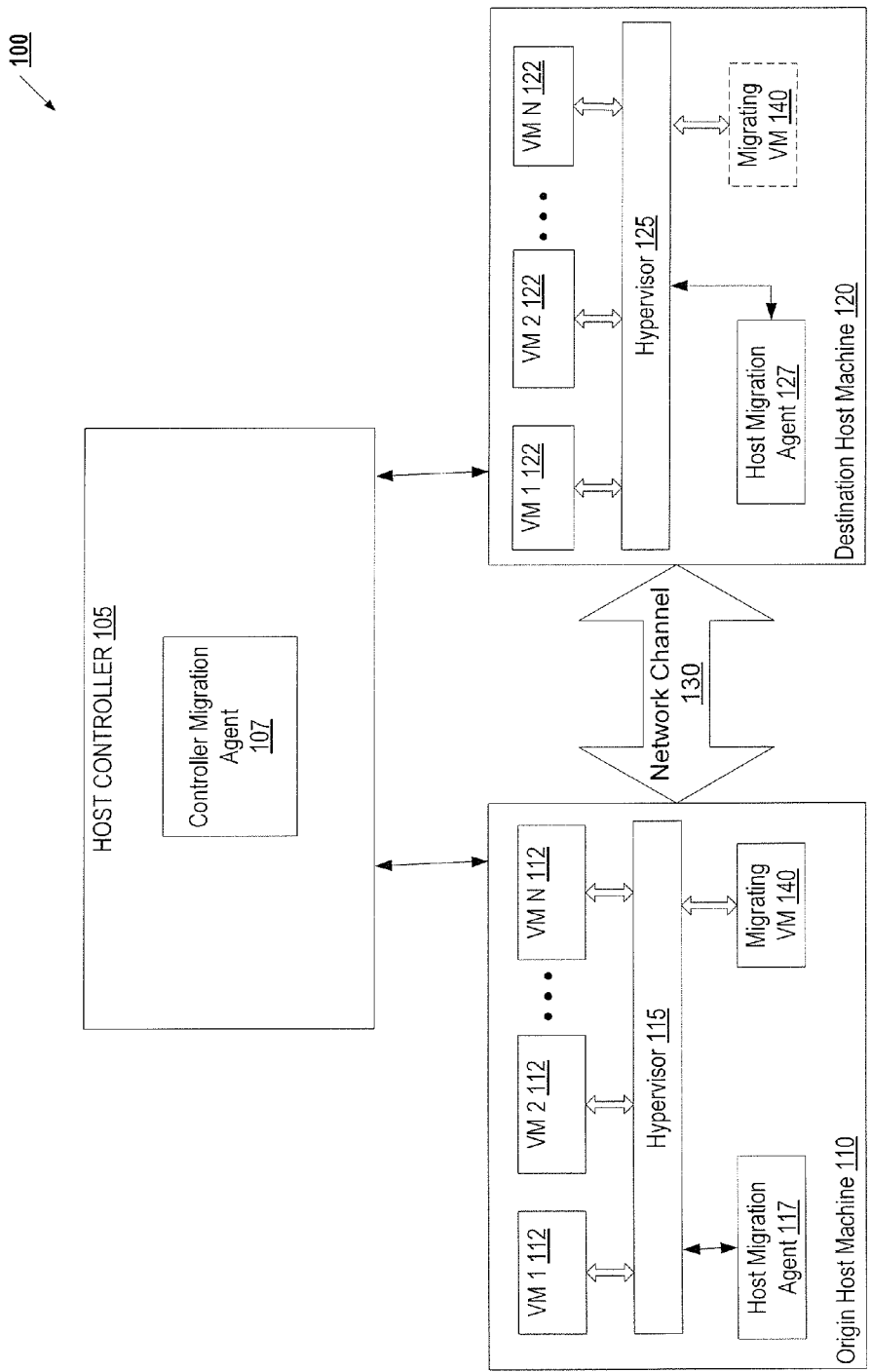
FIG. 1 is a block diagram of an exemplary virtualization architecture in which embodiments of the present invention may operate.

Embodiments of the invention provide a mechanism for virtual machine (VM) resource reduction for live migration optimization. A method of embodiments of the invention includes monitoring a rate of state change of a virtual machine (VM) undergoing a live migration, determining that the rate of state change of the VM exceeds a rate of state transfer of the VM during the live migration process, and adjusting one or more resources of the VM to decrease the rate of state change of the VM to be less than the rate of state transfer of the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "monitoring", "determining", "adjusting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for VM resource reduction for live migration optimization. Specifically, embodiments of the invention throttle computing resources on a VM in a manner to ensure that the rate of state change of a VM is no larger than the rate of migration of the VM. For example, if during live migration a VM is generating more dirty pages than pages being transferred, then embodiments of the invention reduce the amount of resources (e.g., CPU, memory, networking, etc.) dedicated to the VM so that the number of the pages transferred will be higher than of those being dirtied. In some cases, the computing resources are reduced by a constant factor. In other cases, the computing resources are reduced based on the relation between pages dirtied to pages transferred. In some other cases, a pagefault event is reported to the hypervisor when the memory is modified. In this case, the computing resources may be delayed on each pagefault by an amount related to time needed to migrate a page.

FIG. 1 illustrates an exemplary virtualization architecture 100 in which embodiments of the present invention may operate. The virtualization architecture 100 may include one or more host machines 110, 120 to run one or more virtual machines (VMs) 112, 122. Each VM 112, 122 runs a guest operating system (OS) that may be different from one another. The guest OS may include Microsoft Windows, Linux, Solaris, Mac OS, etc. The host 110, 120 may include a hypervisor 115, 125 that emulates the underlying hardware platform for the VMs 112, 122. The hypervisor 115, 125 may also be known as a virtual machine monitor (VMM), a kernel-based hypervisor or a host operating system.

In one embodiment, each VM 112, 122 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110, 120 as a local client. In one scenario, the VM 112, 122 provides a virtual desktop for the client.

As illustrated, the host 110, 120 may be coupled to a host controller 105 (via a network or directly). In some embodiments, the host controller 105 may reside on a designated computer system (e.g., a server computer, a desktop computer, etc.) or be part of the host machine 110, 120 or another machine. The VMs 112, 122 can be managed by the host controller 105, which may add a VM, delete a VM, balance the load on the server cluster, provide directory service to the VMs 112, 122, and perform other management functions.

In one embodiment, host controller 105 may include a controller migration agent 107 that is responsible for migration of a VM 122 between host machines 110, 120 via network channel 130. In addition, each host machine 110, 120 may include a host migration agent 117, 127 to assist controller migration agent 107 in the migration process, or to handle the migration process directly themselves.

For purposes of the following explanation, host machine 110 may be known as the origin host machine 110 from which a VM 140 is migrating from, and host machine 120 may be known as the destination host machine 120 to which the VM 140 is migrating to. Assume VM 140 on origin host machine 110 is live migrating to destination host machine 120. In embodiments of the invention, when it is decided to initiate a live migration process for VM 140 between origin host machine 110 and destination host machine 120, the state of VM 140 will be transferred between the two host machines 110, 120. VM 140 remains operational on origin host machine 110 during this transfer of state.

Embodiments of the invention provide a solution to optimize the VM live migration process by reducing or eliminating VM 140 downtime incurred during the live migration process. In one embodiment, a solution is provided for reducing or throttling resources of a VM 140 in order to allow migration of VM state to complete at a rate greater than the rate that the state of the VM changes. In most cases, the state of the VM refers to the memory of the VM, and the rate of state change includes the rate of dirtying pages of the VM. In embodiments of the invention, instead of stopping the migrating VM 140 completely to finish the migration process, the host migration agent 107, 117 may instead reduce one or more of the VM's 140 resources in such a way so that the VM 140 only utilizes a fraction of the resources allowed by an administrator of the VM 140. The VM 140 resources are reduced so that the amount of state change generated by the VM 140 will not exceed the rate that the VM's 140 state is migrated.

In one embodiment, the resources of the VM 140 that may be reduced or throttled may include, but are not limited to, the CPU, network card, or a graphics card. For purposes of the following explanation, embodiments of the invention will be described in terms of adjusting the VM resource of the CPU. However, one skilled in the art will appreciate that other VM 140 resources may also be adjusted utilizing embodiments of the invention. Furthermore, embodiments of the invention may also be applicable and useful to the process of fault tolerance in a virtualization system, such as providing redundancy for a VM 140 with replicated VMs in the same or different host machines 110, 120.

In embodiments of the invention, the host migration agent 107, 117 may initially determine that the rate of VM 140 state change is exceeding the rate of migration of the VM state. The rate of change can be determined by querying the origin hypervisor 115, while the rate of transfer can be determined by querying either of the origin or the destination hypervisors 115, 125. Once this is determined, the host migration agent 107, 117 may utilize various methods to determine the percentage of the VM 140 resource, for example the amount of CPU processing speed, which will be reduced.

In one embodiment, the VM 140 resource is reduced by a constant factor. For example, the current CPU speed may be divided by a constant factor, such as 1, 2, and so on. If over time the host migration agent 107, 117 determines that this CPU reduction still does not reduce of VM state change to less than the rate of VM state migration, then the host migration agent may continue to divide the CPU speed by a constant factor until the VM state change rate is less than the VM state migration rate.

In another embodiment, the VM 140 resource may be adjusted based on the ratio of VM state migration (memory pages sent) to VM state change (memory pages dirtied). For example, the CPU speed may be adjusted by multiplying the current CPU speed by the quotient of the number of memory pages transferred divided by the number of memory pages dirtied. In some embodiments, this quotient may be further divided by a constant factor in order to give an additional buffer to the CPU speed adjustment.

In a further embodiment, the VM 140 resource may be adjusted by introducing a delay each time a pagefault occurs on the VM 140. When the VM 140 generates new state or new state is generated for the VM 140 by the resource (for example, a network card modifying the VM memory), the VM 140 exits to the hypervisor 115 and the hypervisor 115 may intervene and slow the VM or the resource by introducing a small delay. This delay may then account for the greater speed of state change over migration speed. The delay may be equal to the amount of time it takes to copy the state change via migration. In some embodiments, the delay may be multiplied by a constant factor (e.g., 1, 2, etc.) to provide an added advantage to state transfer over state change.

Embodiments of the invention may utilize a combination of one or more of the above methods of VM resource adjustment calculations. In addition, embodiments of the invention may further apply different adjustments to multiple resources of the VM 140 based on individual characteristics of each of the multiple resources. For instance, if the VM 140 has multiple virtual CPUs, different adjustments may be made to each virtual CPU of the VM based on individual performance of the virtual CPU. Each virtual CPU can then be adjusted to a different rate.

Figure 2:
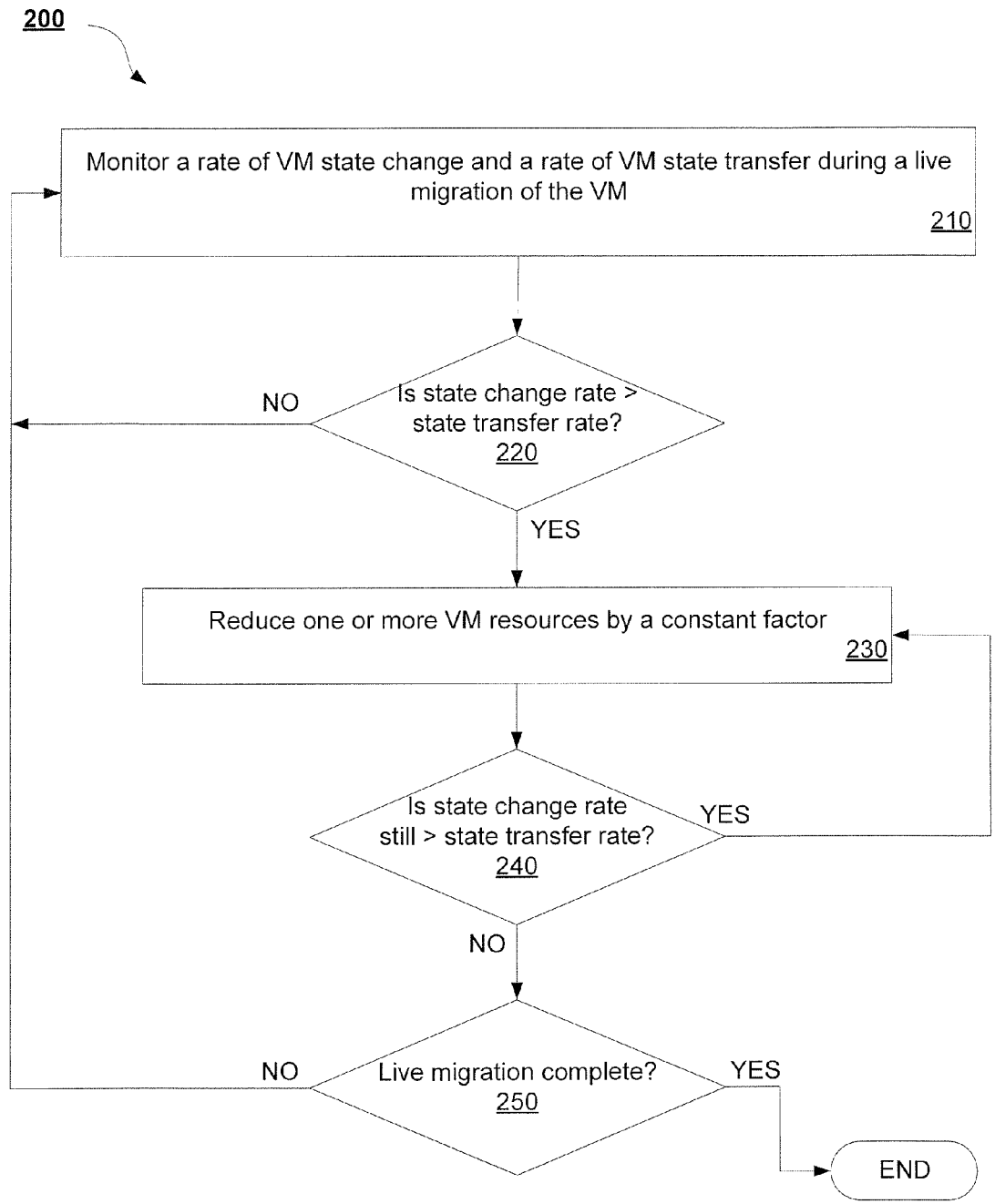
FIG. 2 is a flow diagram illustrating a method for VM resource reduction for live migration optimization according to an embodiment of the invention.

FIG. 2 is a flow diagram illustrating a method 200 for VM resource reduction for live migration optimization according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by host migration agent 107, 117 of FIG. 1.

Method 200 begins at block 210 where the rate of state change of a VM is monitored during the live migration of the VM. Then, at decision block 220, it is determined whether the rate of state change of the VM exceeds the rate of state transfer for the live migration of the VM. If the rate of state change does not exceed the rate of state transfer, then processing returns to block 210 to continue monitoring the rate of state change during the live migration process.

If the rate of state change does exceed the rate of state transfer at decision block 220, then at block 230, a resource of the VM is reduced by a constant factor. For example, the current CPU speed of the VM may be divided by a constant factor, such as 1, 2, and so on. In one embodiment, the host migration agent instructs the hypervisor to reduce the VM resource by this constant factor. At decision block 240, it is determined whether the rate of state change still exceeds the rate of state transfer. If so, then method 200 returns to block 230 to continue to reduce the VM resource by a constant factor. For example, the CPU speed will again be divided by a constant factor until the VM state change rate is less than the VM state migration rate.

If the rate of state change no longer exceeds the rate of state transfer at decision block 240, the method 200 continues to decision block 250 where it is determined whether live migration is complete. If the live migration is not complete at decision block 250, then method 200 returns to block 210 to continue monitoring the rate of state change of the VM during the live migration process. If the live migration process is complete at decision block 250, then method 200 ends.

Figure 3:
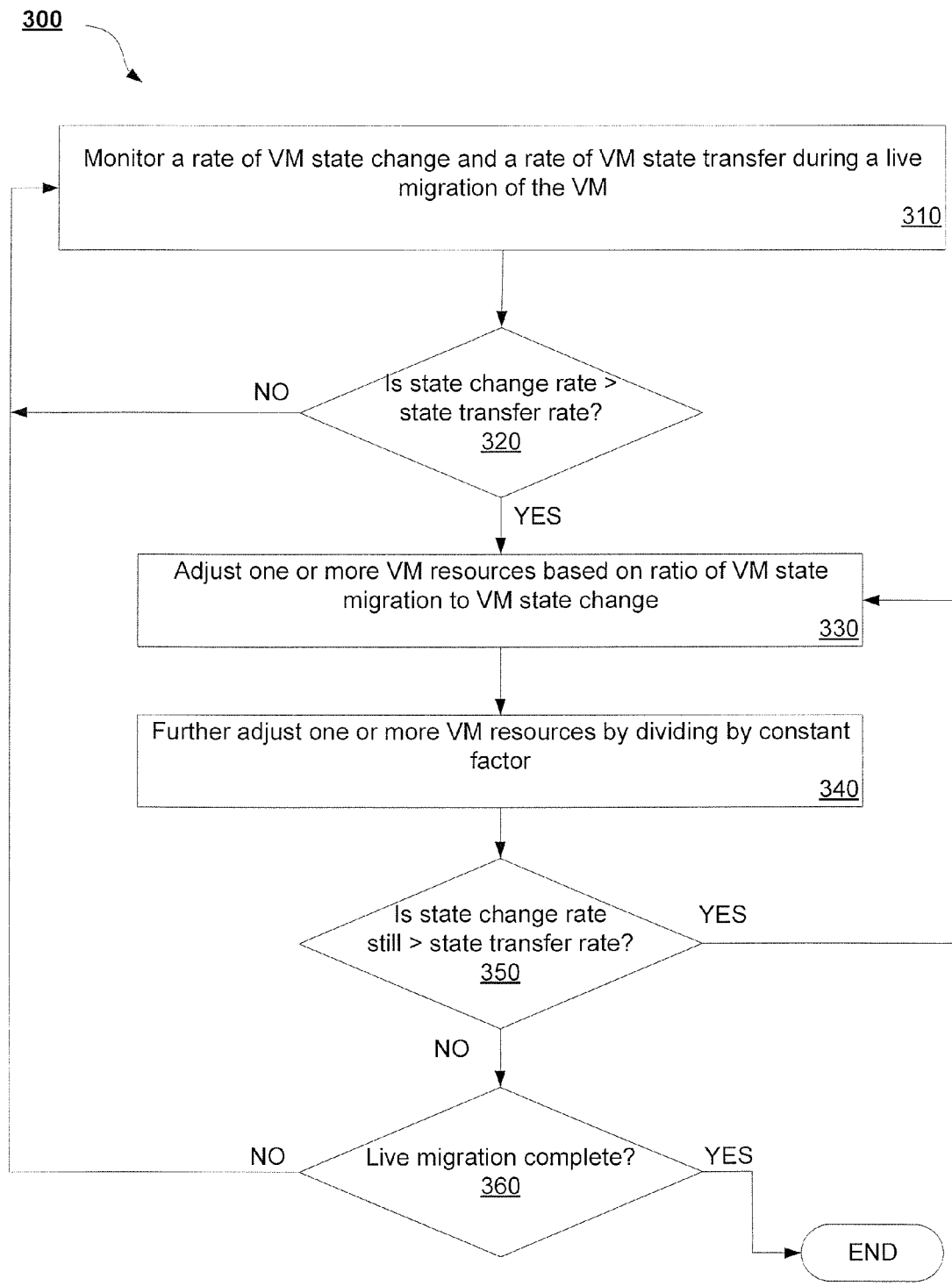
FIG. 3 is a flow diagram illustrating another method for VM resource reduction for live migration optimization according to an embodiment of the invention.

FIG. 3 is a flow diagram illustrating another method 300 for VM resource reduction for live migration optimization according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by host migration agent 107, 117 of FIG. 1.

Method 300 begins at block 310 where the rate of state change of a VM is monitored during the live migration of the VM. Then, at decision block 320, it is determined whether the rate of state change of the VM exceeds the rate of state transfer for the live migration of the VM. If the rate of state change does not exceed the rate of state transfer, then processing returns to block 310 to continue monitoring the rate of state change during the live migration process.

If the rate of state change does exceed the rate of state transfer at decision block 320, then at block 330, a resource of the VM is adjusted based on the ratio of VM state migration to VM state change. For example, the CPU speed may be adjusted by multiplying the current CPU speed by the quotient of the number of memory pages transferred divided by the number of memory pages dirtied. At block 340, the resource of the VM is further adjusted by dividing the resource allocation by a constant factor. For instance, the altered CPU speed from block 330 is divided by a constant factor in order to give an additional buffer to the CPU speed adjustment.

At decision block 350, it is determined whether the rate of state change still exceeds the rate of state transfer. If so, then method 300 returns to block 330 to continue to adjust the VM resource based on the ratio of VM state migration to VM state change. If the rate of state change no longer exceeds the rate of state transfer at decision block 350, the method 300 continues to decision block 360 where it is determined whether live migration is complete. If the live migration is not complete at decision block 360, then method 300 returns to block 310 to continue monitoring the rate of state change of the VM during the live migration process. If the live migration process is complete at decision block 360, then method 300 ends.

Figure 4:
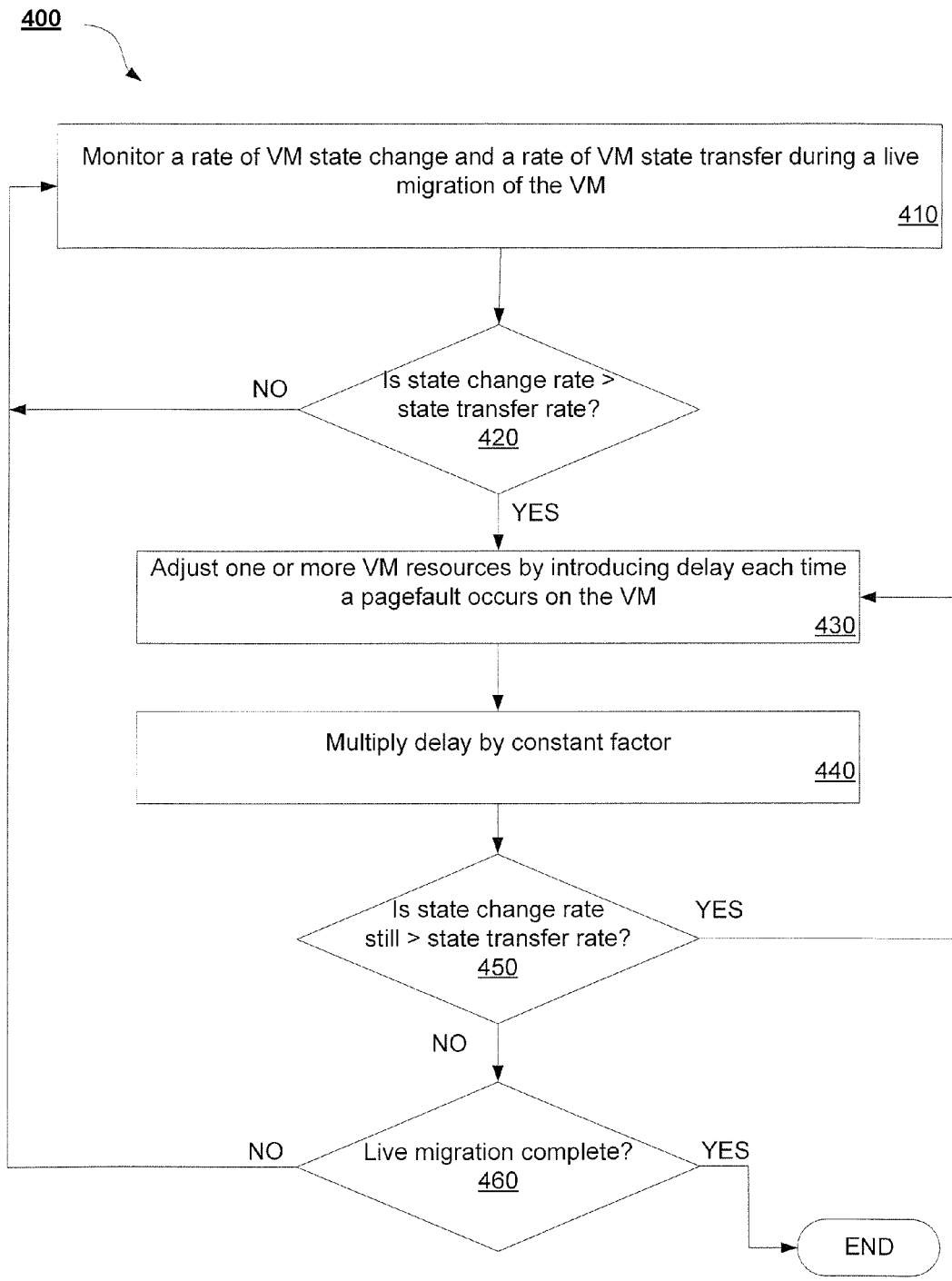
FIG. 4 is a flow diagram illustrating a further method for VM resource reduction for live migration optimization according to an embodiment of the invention.

FIG. 4 is a flow diagram illustrating a further method 400 for VM resource reduction for live migration optimization according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by host migration agent 107, 117 of FIG. 1.

Method 400 begins at block 410 where the rate of state change of a VM is monitored during the live migration of the VM. Then, at decision block 420, it is determined whether the rate of state change of the VM exceeds the rate of state transfer for the live migration of the VM. If the rate of state change does not exceed the rate of state transfer, then processing returns to block 410 to continue monitoring the rate of state change during the live migration process.

If the rate of state change does exceed the rate of state transfer at decision block 420, then at block 430, a resource of the VM is adjusted by introducing a delay each time a pagefault occurs on the VM. Each time the VM generates new state, the VM exits to the hypervisor and the hypervisor may intervene and slow the CPU by introducing a small delay. This delay may then account for the greater speed of state change over migration speed. The delay may be equal to the amount of time it takes to copy the state change via migration. At block 440, the delay is multiplied by a constant factor (e.g., 1, 2, etc.) to provide an added advantage to state transfer over state change.

At decision block 450, it is determined whether the rate of state change still exceeds the rate of state transfer. If so, then method 400 returns to block 430 to continue to adjust the VM resource by introducing a delay each time a pagefault occurs on the VM. If the rate of state change no longer exceeds the rate of state transfer at decision block 450, the method 400 continues to decision block 460 where it is determined whether live migration is complete. If the live migration is not complete at decision block 460, then method 400 returns to block 410 to continue monitoring the rate of state change of the VM during the live migration process. If the live migration process is complete at decision block 460, then method 400 ends.

Figure 5:
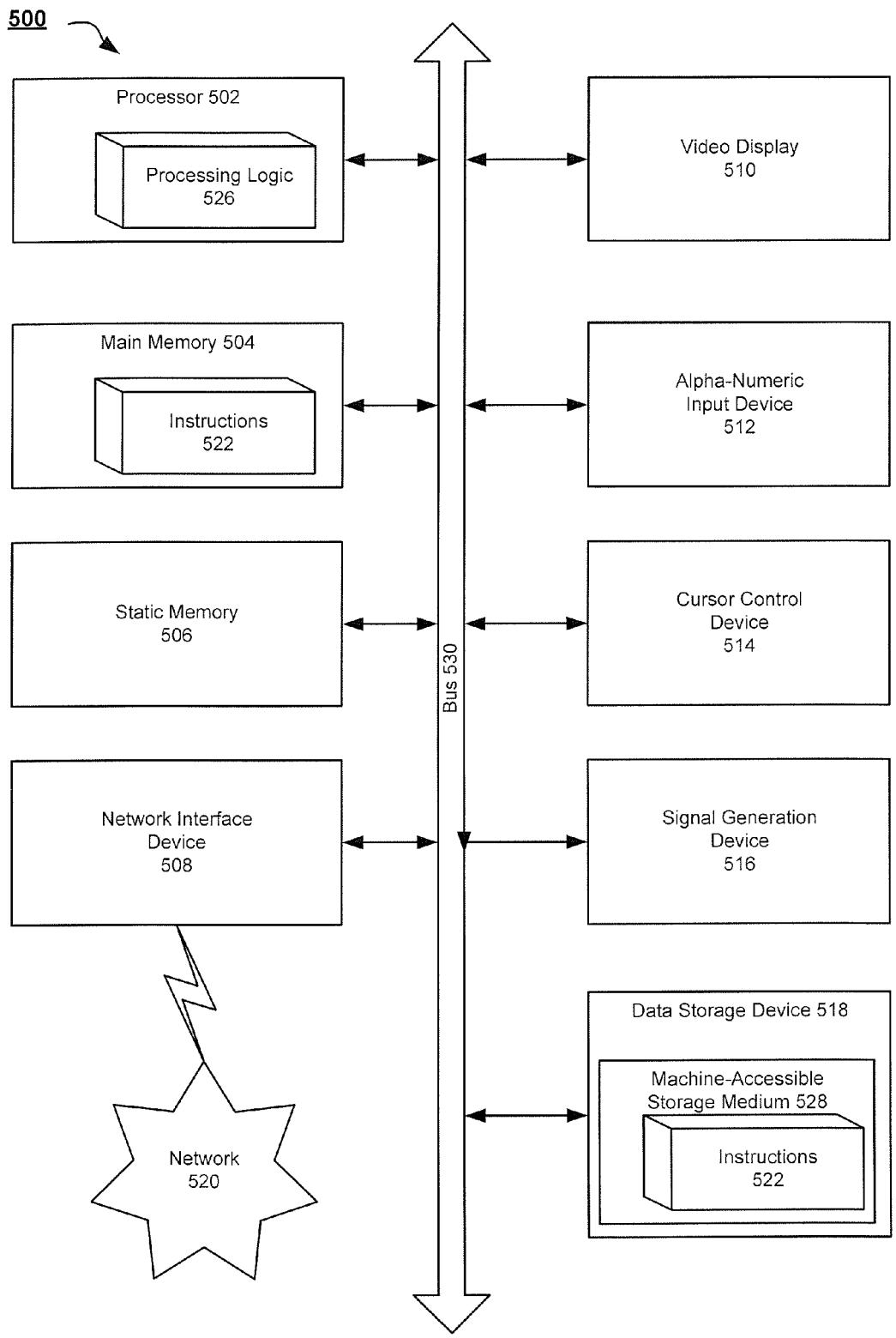
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform VM resource reduction for live migration optimization by host migration agent 107, 117 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 200, 300, and 400 for VM resource reduction for live migration optimization described with respect to FIGS. 2, 3, and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
monitoring, by a processing device of a host machine managing a virtual machine (VM), a rate of modification of memory pages of the VM during a live migration of the VM;
comparing, by the processing device of the host machine, the rate of modification to a rate of migration of the memory pages during the live migration; and
when the rate of modification exceeds the rate of migration, adjusting, by the host machine, one or more resources of the VM to decrease the rate of modification to be less than the rate of migration, wherein the adjusting comprises at least one of dividing the one or more resources by a first constant factor or multiplying a delay by a second constant factor, and wherein the adjusting is in view of the rate of migration and the rate of modification, and wherein the adjusting adjusts a speed of a first virtual CPU and a speed of a second virtual CPU separately.

2. The method of claim 1, wherein the one or more resources of the VM comprises memory.

3. The method of claim 1, wherein the speed of the first virtual CPU is adjusted in view of performance of the first virtual CPU, and wherein the speed of the second virtual CPU is adjusted in view of performance of the second virtual CPU.

4. The method of claim 1, wherein the delay is in view of a pagefault on the VM.

5. A system, comprising:
a memory to store a virtual machine (VM); and
a processing device, operatively coupled to the memory, to:
the processing to:
monitor a rate of modification of memory pages of the VM during a live migration of the VM,
compare the rate of modification to a rate of migration of the memory pages during the live migration, and
when the rate of modification exceeds the rate of migration, adjust one or more resources of the VM to decrease the rate of modification to be less than the rate of migration, wherein the adjusting comprises at least one of dividing the one or more resources by a first constant factor or multiplying a delay by a second constant factor, and wherein the adjusting is in view of the rate of migration and the rate of modification, and wherein the adjusting adjusts a speed of a first virtual CPU and a speed of a second virtual CPU separately.

6. The system of claim 5, wherein the speed of the first virtual CPU is adjusted in view of performance of the first virtual CPU, and wherein the speed of the second virtual CPU is adjusted in view of performance of the second virtual CPU.

7. The system of claim 5, wherein the delay is in view of a pagefault on the VM.

8. A non-transitory machine-readable storage medium including instructions that, when accessed by a processing device, cause the processing device to:
monitor, by the processing device of a host machine managing a virtual machine (VM), a rate of modification of memory pages of the VM during a live migration of the VM;
compare, by the processing device, the rate of modification to a rate of migration of the memory pages during the live migration; and
when the rate of modification exceeds the rate of migration, adjust one or more resources of the VM to decrease the rate of modification to be less than the rate of migration, wherein the adjusting comprises at least one of dividing the one or more resources by a first constant factor or multiplying a delay by a second constant factor, and wherein the adjusting is in view of the rate of migration and the rate of modification, and wherein the adjusting adjusts a speed of a first virtual CPU and a speed of a second virtual CPU separately.

9. The non-transitory machine-readable storage medium of claim 8, wherein the speed of the first virtual CPU is adjusted in view of performance of the first virtual CPU, and wherein the speed of the second virtual CPU is adjusted in view of performance of the second virtual CPU.

10. The non-transitory machine-readable storage medium of claim 8, wherein the delay is in view of a pagefault on the VM.

* * * * *